(12) United States Patent
Schwartz (10) Patent No.: US 9,727,844 B2
(45) Date of Patent: Aug. 8, 2017

(54) ONLINE DOCUMENTATION REVIEW (71) Applicant: International Business Machines Corporation, Armonk, NY (US)

(72) Inventor: Kevin L. Schwartz, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 854 days.

(21) Appl. No.: 13/733,014

(22) Filed: Jan. 2, 2013

(65) Prior Publication Data

US 2014/0189504 A1    Jul. 3, 2014

(51) Int. Cl.
*G06F 3/00* (2006.01)
*G06Q 10/10* (2012.01)

(52) U.S. Cl.
CPC .................... *G06Q 10/101* (2013.01)

(58) Field of Classification Search
CPC .............................. G06F 17/241; G06F 17/212
USPC ........................................ 715/273, 751, 230
See application file for complete search history.

(56) References Cited

U.S. PATENT DOCUMENTS

| 7,107,518 | B2 | 9/2006 | Ramaley et al. | |
|---|---|---|---|---|
| 7,194,679 | B1 | 3/2007 | Green | |
| 7,219,301 | B2 * | 5/2007 | Barrie | G06Q 50/00 434/322 |
| 7,263,655 | B1 * | 8/2007 | Carden, Jr. | G06F 17/212 707/E17.008 |
| 7,386,831 | B2 | 6/2008 | Flanagan | |
| 7,958,127 | B2 | 6/2011 | Edmonds et al. | |
| 2002/0169771 | A1 * | 11/2002 | Melmon | G06F 17/30011 |
| 2006/0026502 | A1 | 2/2006 | Dutta | |
| 2007/0100662 | A1 * | 5/2007 | Suwalski | G06Q 10/06 705/2 |
| 2007/0192333 | A1 * | 8/2007 | Ali | G06F 17/3089 |
| 2007/0233544 | A1 * | 10/2007 | Frank | G06Q 10/10 705/310 |
| 2008/0250333 | A1 * | 10/2008 | Reeves | G06F 3/0483 715/753 |

(Continued)

FOREIGN PATENT DOCUMENTS

JP    2007140731    6/2007

*Primary Examiner* — Scott Baderman
*Assistant Examiner* — Hassan Mrabi
(74) *Attorney, Agent, or Firm* — Kunzler Law Group (57) ABSTRACT

An apparatus, method, and computer program product for online documentation review. The apparatus includes a documentation presentation module configured to visually present a list of documents within a documentation frame. The content of one or more documents selected from the list of documents may also be visually presented. The online documentation framework may facilitate navigation of the documentation package. The apparatus also includes a documentation review module configured to receive and store comments associated with at least one document in the documentation package. The comments may be stored on a computer readable storage medium. The apparatus includes an integration module configured to integrate the documentation review application into the online documentation framework such that comments associated with the at least one document of the documentation package may be one or more of submitted and viewed from within the online documentation framework.

17 Claims, 5 Drawing Sheets

(56) References Cited

U.S. PATENT DOCUMENTS

| | | | |
|---|---|---|---|
| 2008/0295085 A1* | 11/2008 | Rachamadugu | G06F 8/75 717/159 |
| 2009/0094530 A1* | 4/2009 | Champlain | G06Q 10/10 715/752 |
| 2010/0242028 A1 | 9/2010 | Weigert | |
| 2011/0055677 A1 | 3/2011 | Lima et al. | |
| 2012/0060081 A1* | 3/2012 | Barrie | G06F 17/241 715/230 |
| 2012/0159351 A1* | 6/2012 | Bell | G06F 3/01 715/753 |
| 2012/0191716 A1* | 7/2012 | Omoigui | 707/740 |
| 2012/0246170 A1* | 9/2012 | Iantorno | G06F 8/77 707/748 |
| 2013/0132455 A1* | 5/2013 | Mangini | G06Q 10/10 709/201 |
| 2013/0179761 A1* | 7/2013 | Cho | G06F 17/21 715/202 |
| 2013/0246901 A1* | 9/2013 | Massand | G06F 17/24 715/229 |
| 2013/0283398 A1* | 10/2013 | Wu | G06F 21/60 726/28 |
| 2014/0033015 A1* | 1/2014 | Shaver | 715/233 |

\* cited by examiner

ONLINE DOCUMENTATION REVIEW

BACKGROUND

Field

The subject matter disclosed herein relates to collaboration tools and more particularly relates to online documentation review.

Description of the Related Art

Collaboration tools allow individuals within a group to work together to more easily and effectively solve a predefined task. A typical collaboration tool includes software that allows members of a group to review, comment, and otherwise provide feedback that is viewable by the other members of a group. Often collaboration software tools provide online accessibility, which allows members of a group to work together regardless their location.

Documentation systems, such as IBM® Corporation's Information Centers, allow users to easily access and view product and/or service documentation. Often the documentation provided in the Information Centers is the product of various interested groups. Thus, in order to ensure the accuracy and utility of the documentation content, members of the interested parties need to collaborate.

BRIEF SUMMARY

A method is presented. In one embodiment, the method includes providing an online documentation framework that visually presents a list of documents within a documentation frame. The content of one or more documents selected from the list of documents may also be visually presented. In one embodiment, the online documentation framework may facilitate navigation of the documentation package. The method also includes, in one embodiment, providing a documentation review application that receives and stores comments associated with at least one document in the documentation package. The comments may be stored on a computer readable storage medium. In one embodiment, the method includes integrating the documentation review application into the online documentation framework such that comments associated with the at least one document of the documentation package may be one or more of submitted and viewed from within the online documentation framework.

An apparatus is presented. In one embodiment, the apparatus includes a documentation presentation module configured to visually present a list of documents within a documentation frame. The content of one or more documents selected from the list of documents may also be visually presented. In one embodiment, the online documentation framework may facilitate navigation of the documentation package. The apparatus also includes, in one embodiment, a documentation review module configured to receive and store comments associated with at least one document in the documentation package. The comments may be stored on a computer readable storage medium. In one embodiment, the apparatus includes an integration module configured to integrate the documentation review application into the online documentation framework such that comments associated with the at least one document of the documentation package may be one or more of submitted and viewed from within the online documentation framework.

A computer program product comprising a computer readable storage medium storing machine readable code executed by a processor to perform operations for online documentation review is presented. In one embodiment, the operations include providing an online documentation framework that visually presents a list of documents within a documentation frame. The content of one or more documents selected from the list of documents may also be visually presented. In one embodiment, the online documentation framework may facilitate navigation of the documentation package. The operations may also include, in one embodiment, providing a documentation review application that receives and stores comments associated with at least one document in the documentation package. The comments may be stored on a computer readable storage medium. In one embodiment, the operations include integrating the documentation review application into the online documentation framework such that comments associated with the at least one document of the documentation package may be one or more of submitted and viewed from within the online documentation framework.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer readable medium may be a tangible computer readable storage medium storing the program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable storage medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store program code for use by and/or in connection with an instruction execution system, apparatus, or device.

The computer readable medium may also be a computer readable signal medium. A computer readable signal medium may include a propagated data signal with program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport program code for use by or in connection with an instruction execution system, apparatus, or device. Program code embodied on a computer readable signal medium may be transmitted using any appropriate medium, including but not limited to wire-line, optical fiber, Radio Frequency (RF), or the like, or any suitable combination of the foregoing In one embodiment, the computer readable medium may comprise a combination of one or more computer readable storage mediums and one or more computer readable signal mediums. For example, program code may be both propagated as an electro-magnetic signal through a fiber optic cable for execution by a processor and stored on RAM storage device for execution by the processor.

Program code for carrying out operations for aspects of the present invention may be written in any combination of one or more programming languages, including an object oriented programming language such as Java, Smalltalk, C++, PHP or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program product may be shared, simultaneously serving multiple customers in a flexible, automated fashion. The computer program product may be standardized, requiring little customization and scalable, providing capacity on demand in a pay-as-you-go model.

The computer program product may be stored on a shared file system accessible from one or more servers. The computer program product may be executed via transactions that contain data and server processing requests that use Central Processor Unit (CPU) units on the accessed server. CPU units may be units of time such as minutes, seconds, hours on the central processor of the server. Additionally the accessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same computer program product via shared execution, transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the computer program product. The summed measurements of use units are periodically multiplied by unit costs and the resulting total computer program product service costs are alternatively sent to the customer and or indicated on a web site accessed by the customer which then remits payment to the service provider.

In one embodiment, the service provider requests payment directly from a customer account at a banking or financial institution. In another embodiment, if the service provider is also a customer of the customer that uses the computer program product, the payment owed to the service provider is reconciled to the payment owed by the service provider to minimize the transfer of payments.

The computer program product may be integrated into a client, server and network environment by providing for the computer program product to coexist with applications, operating systems and network operating systems software and then installing the computer program product on the clients and servers in the environment where the computer program product will function.

In one embodiment software is identified on the clients and servers including the network operating system where the computer program product will be deployed that are required by the computer program product or that work in conjunction with the computer program product. This includes the network operating system that is software that enhances a basic operating system by adding networking features.

In one embodiment, software applications and version numbers are identified and compared to the list of software applications and version numbers that have been tested to work with the computer program product. Those software applications that are missing or that do not match the correct version will be upgraded with the correct version numbers. Program instructions that pass parameters from the computer program product to the software applications will be checked to ensure the parameter lists match the parameter lists required by the computer program product. Conversely parameters passed by the software applications to the computer program product will be checked to ensure the parameters match the parameters required by the computer program product. The client and server operating systems including the network operating systems will be identified and compared to the list of operating systems, version numbers and network software that have been tested to work with the computer program product. Those operating systems, version numbers and network software that do not match the list of tested operating systems and version numbers will be upgraded on the clients and servers to the required level.

In response to determining that the software where the computer program product is to be deployed, is at the correct version level that has been tested to work with the computer program product, the integration is completed by installing the computer program product on the clients and servers.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by program code. The program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The program code may also be loaded onto a computer, other programmable data processing apparatus, or other devices to cause a series of operational steps to be performed on the computer, other programmable apparatus or other devices to produce a computer implemented process such that the program code which executed on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

The description of elements in each figure may refer to elements of proceeding figures. Like numbers refer to like elements in all figures, including alternate embodiments of like elements.

Figure 1:
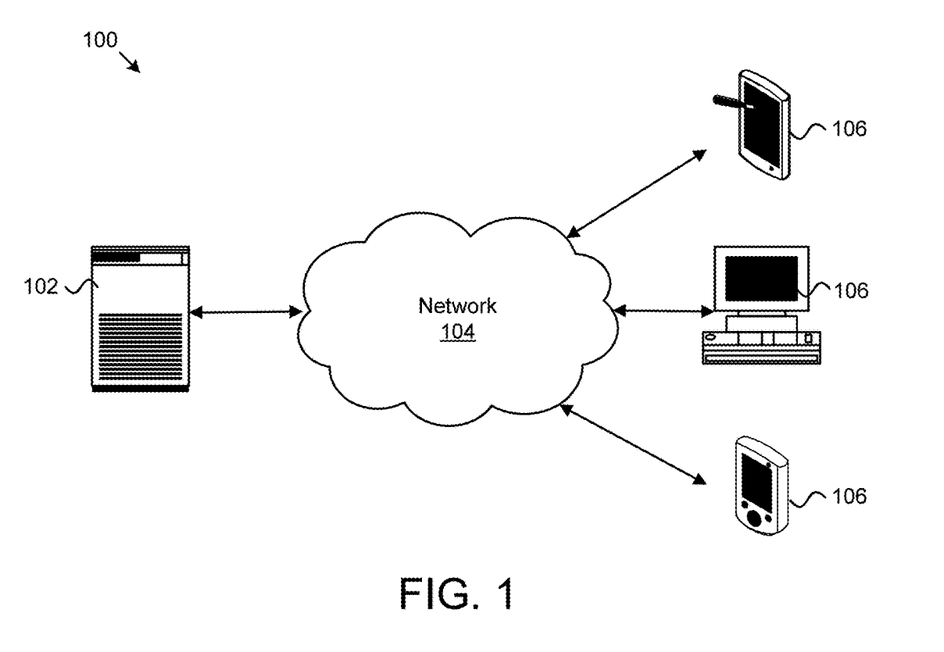
FIG. 1 is a schematic block diagram illustrating one embodiment of a system for online document review.

FIG. 1 is a schematic block diagram illustrating one embodiment of a system 100 for online documentation review. In the depicted embodiment, the system 100 includes a server 102, a network 104, and a plurality of electronic devices 106. In one embodiment, the electronic devices 106 may also be embodied as client devices. As used herein, the server 102 may be configured as a mainframe computer, a blade center comprising multiple blades, a desktop computer, a laptop computer, and the like. Although for simplicity one server 102, one network 104, and three clients 106 are shown, any number of servers 102, networks 104, and clients 106 may be employed.

The server 102, in one embodiment, may include computer readable storage media storing executable code and may include a processor that executes the executable code as is well known to those skilled in the art. The executable code may be tangibly stored in computer readable storage media in communication with the server 102. The server 102 may store data regarding product and/or service documentation, which may be accessed and/or downloaded over the network 104 by the plurality of clients 106. In one embodiment, the server 102 may be specifically designed for an embodiment of the invention disclosed herein and may include an online documentation review apparatus 200, which will be described in more detail below with reference to FIG. 2.

The network 104 may include a global communications network such as the internet, a Local Area Network ("LAN"), multiple LANs communicating over the internet, a wide area network ("WAN"), or any other similar communications network. The network 104 may include hardware such as routers, switches, cabling, and other communication hardware. Each client 106 may be embodied as a portable computer, a handheld computing device, a touch device, a personal desktop assistant ("PDA"), a tablet computer, a mobile phone, a smart phone, and the like.

In one embodiment, each client 106 may communicate with the server 102 through the network 104. In another embodiment, a client 106 communicates with the server 102 by way of a program executing on the client 106, such as a mobile application configured to access, download, and/or upload data from the server 102. In certain embodiments, the application on the client device 106 may allow user interaction by using an input device, such as a keyboard, a stylus, or the like.

Figure 2:
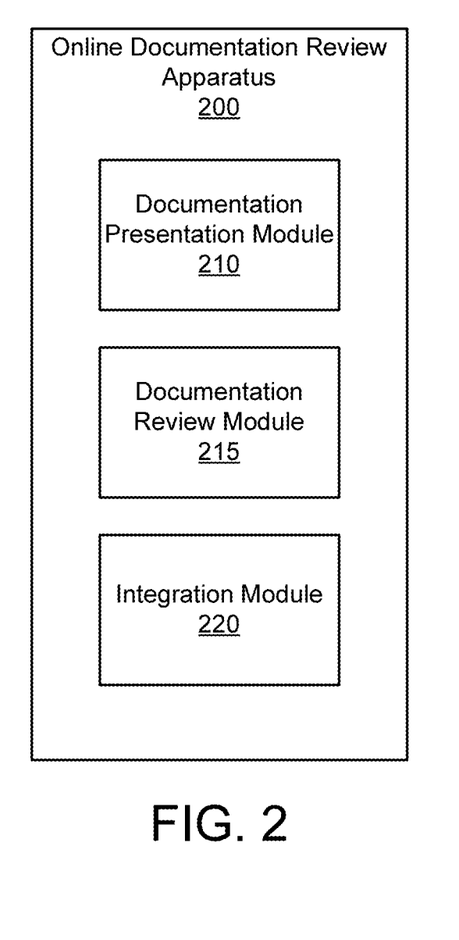
FIG. 2 is a schematic block diagram illustrating one embodiment of an online documentation review apparatus.

FIG. 2 is a schematic block diagram illustrating one embodiment of an online documentation review apparatus 200. In one embodiment, the apparatus includes a documentation presentation module 210, a documentation review module 215, and an integration module 220.

The documentation presentation module 210, in one embodiment, visually presents a list of documents within a documentation package in a framework that facilitates navigation of the documentation package. In one embodiment, the documents may be listed in a navigation frame 502, as described below with reference to FIG. 5, and may be organized by section, topic, chapter, or the like. In another embodiment, the list of documents is linked to a content frame 504 such that selecting a document in the list may display the content of the document in the content frame 504. The documentation package, in one embodiment, may include documentation regarding products, services, and the like. The content of the documentation package, in some embodiments, may include text files, PDF files, multimedia files, such as images, videos, audio files, and the like.

Figure 5:
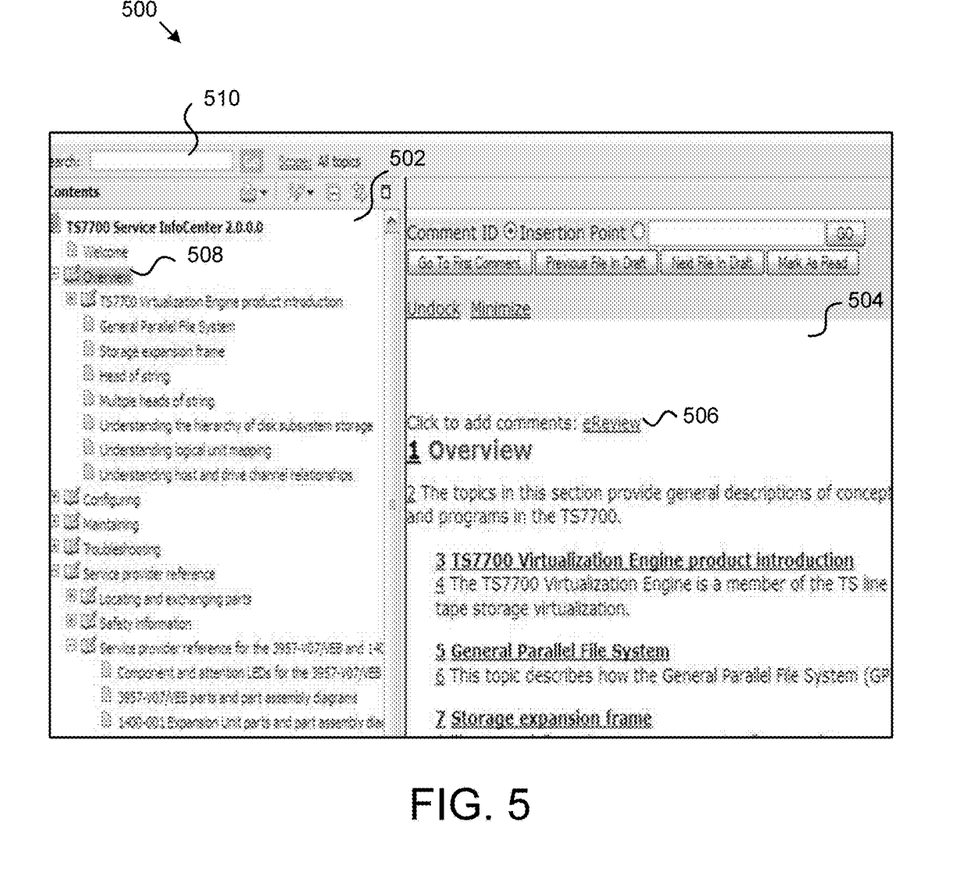
FIG. 5 depicts an example embodiment of an apparatus for online documentation review.

In one embodiment, the documentation presentation module 210 visually displays the content in a functionally and aesthetically pleasing manner depending on the type of electronic device being used to view the content. For example, if the content is viewed on a device with a large electronic display, the documentation presentation module 210 may layout the navigation frame 502 and the content frame 504 side-by-side such that the list of documents and the content of the selected document may be viewable simultaneously. Alternatively, if the content is viewed on a device with a smaller electronic display, such as a smart phone or tablet, the content frame 504 may utilize the entire viewing area and the navigation frame 502 may be accessed through a drop-down interface or the like. One of skill in the arts will recognize ways to display a list of items on a device with a limited view area.

In one embodiment, the documentation presentation module 210 is available online and is accessible by remote clients 106 over a network 104, such as the Internet, an intranet, and the like. In one embodiment, online access to the documentation presentation module 210 may be open to the public via a public link or the like. In another embodiment, access may be limited to authorized users through a security protocol. In certain embodiments, the documentation presentation module 210 may utilize a handshake authentication protocol in order to verify the identity of remote clients 106. Other security measures, such as digital certificates, encryption algorithms, and the like, may be implemented by the documentation presentation module 210 in order to maintain the integrity of the data being transferred. In another embodiment, an authorization protocol, such as a username and password, may be required to access the documentation presentation module 210.

In another embodiment, the documentation presentation module 210 may be embodied as an Information Center by International Business Machines Corporation ("IBM") of Armonk, N.Y. The Information Center, in one embodiment, may present documentation associated with one or more IBM developed products or services. The Information Center, in another embodiment, utilizes the Eclipse framework, also developed by IBM, which provides additional features such as searching and printing, as described below with reference to FIG. 3.

In one embodiment, an Information Center, such as a Service Information Center, may be limited to internal use such that access is restricted to IBM employees and other interested parties, stakeholders, and the like. In another embodiment, a Customer Information Center may be publicly available online such that access is not blocked by a firewall and does not require any authentication.

In one embodiment, the documentation review module 215 receives and stores comments associated with one or more documents included in the documentation package. In certain embodiments, the comments may be stored on a computer readable storage medium located on the server 102. In another embodiment, the documentation review module 215 visually displays the comments associated with a document. For example, a documentation developer may provide feedback regarding the content, organization, grammar, and the like, of a document, and may provide other suggestions to improve the documentation. The documentation developer's comments may be added to a list of comments associated with the document and displayed for other users to see. In this manner, users may collaborate to improve the content of the documents included in the documentation package. In one embodiment, the selected document may be marked-up with its associated comments. In another embodiment, the selected document's comments may be displayed in a separate frame or window.

Similar to the documentation presentation module 210, the documentation review module 215 may also be accessed online through a network 104. In one embodiment, access is limited to authorized users, such as employees, documentation developers, and the like, such that authentication is required to use, create, and view comments. Authentication may be provided through a security protocol such as a username and password. Other security measures, in one embodiment, may be utilized, such as access control lists, encryption, firewalls, digital certificates, and the like, to ensure the integrity and security of the data. In another embodiment, public access may be provided such that comments may be submitted and/or viewed by anyone with a link to the documentation review module 215.

In another embodiment, the documentation review module 215 may be embodied as an E-Review application developed by IBM. In one embodiment, the E-Review application may be embodied as an online collaboration tool, allowing documentation developers to collaborate during the creation of documentation displayed by an Information Center. In one embodiment, documentation developers may collaborate by viewing and submitting comments regarding the content of the documentation. In another embodiment, the E-Review application may provide remote access over a network, such as the Internet, which facilitates the collaboration of documentation developers who may be located at different geographical locations. In certain embodiments, documentation developers may submit comments for single documents and/or entire documentation packages.

In one embodiment, the integration module 220 integrates the documentation review module 215 into the documentation presentation module 210 such that comments associated with a document may be submitted and/or viewed from within the framework presented by the documentation presentation module 210. In one embodiment, the integration module 220 displays a link, a button, or the like, in the documentation framework presented by the documentation presentation module 210. When clicked, in one embodiment, the link displays the documentation review module 215 such that a documentation developer may view and/or submit comments associated with a selected document. In this manner, a documentation developer may easily toggle between an unmarked-up version of a document and a marked-up version with comments interspersed throughout the document. In one embodiment, the integration module 220 receives information from the documentation review module 215 in real-time, which allows documentation developers to view new comments immediately.

In one embodiment, the integration module 220 presents the documentation review module 215 in a separate window. In another embodiment, the documentation review module 215 is displayed in a frame within the framework presented by the documentation presentation module 210, such as the content frame 504 or a separate review frame. In this manner, a documentation developer does not need to toggle between the documentation review application and the documentation presentation framework in order to view and/or submit comments. In one embodiment, the link contains JavaScript and/or HTML code that directs a documentation developer to the correct review context for the selected document, such that it is executable by a computer program such as an Internet browser. One of skill in the art will recognize various ways of presenting an interactive link on a computer.

In one embodiment, the integration module 220 integrates an E-Review tool into an Information Center such that a documentation developer may review the documentation associated with the selected document within the Information Center framework. For example, a documentation developer, instead of switching to the E-Review application to provide feedback for the selected document, may click on a link displayed within the Information Center, which is associated with the document selected in the visually presented list of documents. The integration module 220 displays the E-Review application within the Information Center framework such that a documentation developer may view other's comments or submit their own comments related to the selected document. The integration of the Information Center and the E-Review application by the integration module 220 allows the documentation developer to stay within the Information Center to view and/or submit comments and not have to switch contexts to the E-Review application.

Figure 3:
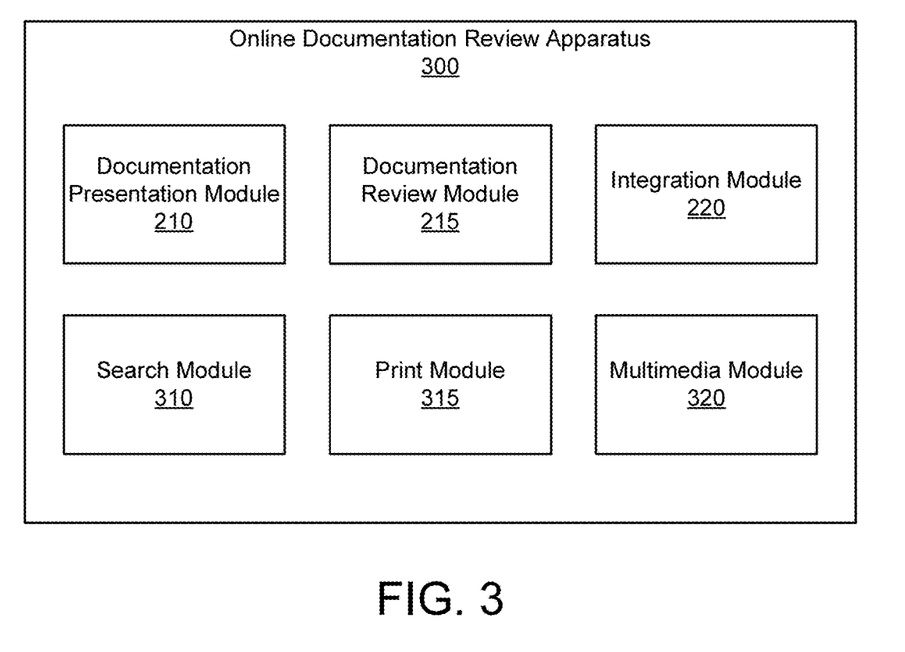
FIG. 3 is a schematic block diagram illustrating another embodiment of an online documentation review apparatus.

FIG. 3 is a schematic block diagram illustrating another embodiment of an online documentation review apparatus 300. The description of the apparatus 300 refers to elements of FIGS. 1 and 2, like numbers referring to like elements. The depicted apparatus 300 includes a documentation presentation module 210, a documentation review module 215, and an integration module 220, wherein these modules may be substantially similar to the like numbered modules in FIG. 2. Further, the apparatus 300 includes a search module 310, a print module 315, and a multimedia module 320, which are described below.

In one embodiment, the search module 310 searches the documentation package based on one or more keywords, file types, creation dates, or the like. In another embodiment, a search scope may be set such that the search is limited to a specific product and/or service or a set of products and/or services. For example, a documentation package may contain sections such as configuration, planning, installing, managing, and the like. A user may set a specific search scope to limit the search to only the configuration section and then further do a keyword search within that section.

In another embodiment, the search module 310 is synced to the navigation capabilities of the documentation presentation module 210 such that search results returned by the search module 310 may be highlighted in the visually presented list of documents in the navigation frame 502. In some embodiments, clicking on a search result item may automatically present that file in the navigation frame 502.

For example, with reference to FIG. 5, if the documents are presented in a tree structure in the navigation frame 502, when a search result is clicked on, the tree will expand to prominently present the selected document. Alternatively, in another embodiment, if the documents are displayed in a flat list in the navigation frame 502, when a search result is clicked, the navigation frame 502 will scroll to the selected document. In one embodiment, the search module 310 provides a quick search feature in the navigation frame 502 such that the titles of the listed documents may be quickly searched. Further, in another embodiment, the quick search feature provides real-time searching such that as a keyword is typed into the search field, the list of documents is narrowed by removing documents from the list that do not match the search parameters.

Search results, in one embodiment, may be listed in the content frame 504 according to a predetermined search ranking. In another embodiment, the search results may be presented in a separate window. The search module 310, in some embodiments, searches within the search results to further narrow the search. In yet a further embodiment, the search module 310 searches a keyword within a document displayed in the content window. A user, by keyboard shortcut or a menu item, may perform a quick keyword search to locate a specific word within the currently displayed document. In some embodiments, the search module 310 may store the search results and/or the search parameters to be recalled for subsequent searches.

The print module 315, in one embodiment, prints the contents of the documentation package. In some embodiments, the print module 315 prints the entire contents of the documentation package. In another embodiment, the print module 315 prints one or more sections of the documentation package. In yet a further embodiment, one or more documents may be printed by the print module 315. The print module 315, in one embodiment, may print the documentation content to a file format, such as PDF, XPS, PostScript, or the like. In another embodiment, the print module 315 prints to a printer attached to the electronic device 106, either directly or through a network 104, such as a laser printer, inkjet printer, and the like.

In one embodiment, the multimedia module 320 may display links to external documents, websites, videos, and the like to facilitate learning to use the features of the products and/or services related to the documentation package. In another embodiment, the multimedia module 320 may embed multimedia content, such as video and audio, in a page within the documentation presentation module 210. In yet a further embodiment, the multimedia module 320 may present multimedia content as part of an "E-Learning" system to further facilitate learning to use the products and/or services.

Within an Information Center, in one embodiment, the multimedia module 320 may present a "Welcome" page when the Information Center is first entered and before any documents are clicked in the navigation frame 502. The "Welcome" page may contain links to other sources, such as "Popular Topics," "Troubleshooting Tools," "Support," and the like, to help users learn to use the products and/or services. In another embodiment, where an Information Center is accessible to the public, a support community may be established such that users may provide feedback, including multimedia content, for the benefit of other users. User feedback may be comments related to the documentation or may include feedback about products and/or services.

Figure 4:
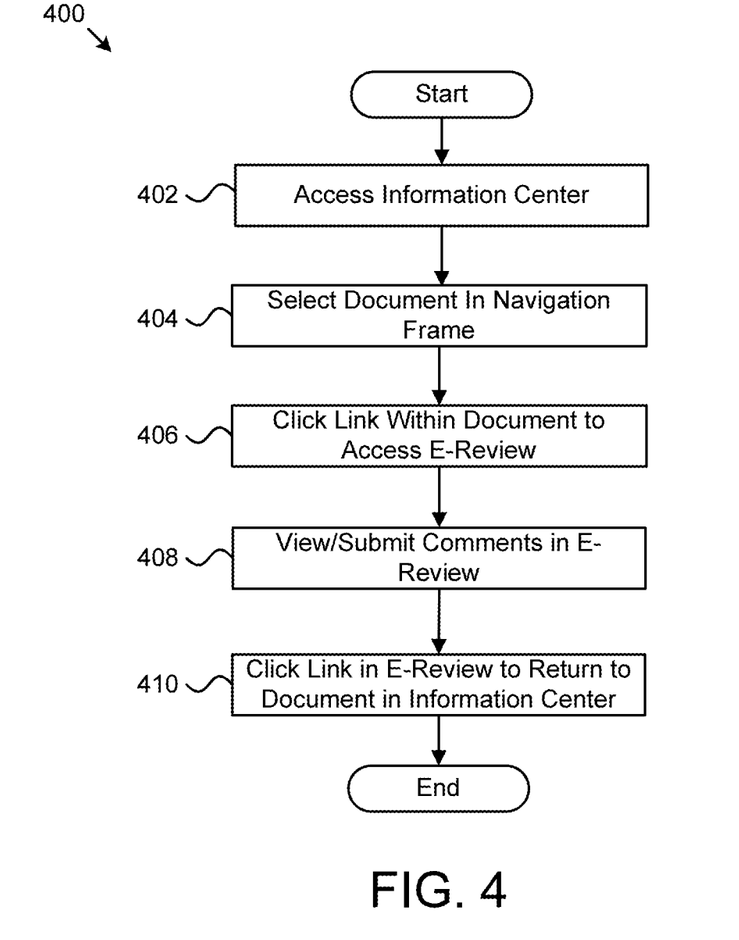
FIG. 4 is a schematic flow chart diagram illustrating an embodiment of a method for online documentation review.

FIG. 4 is a schematic flow chart diagram illustrating an embodiment of a method 400 for online documentation review. The method 400 may be performed by a computer program product. The method 400 may perform at least a portion of the functions of the apparatus 200.

The method 400 starts and the Information Center is accessed 402 through a network 104 by a user using an electronic device 106. The user selects 404 a document that is visually presented by the documentation presentation module 210 in the navigation frame 502. In one embodiment, to view and/or submit comments related to the selected document, the user clicks 406 a link located within the document displayed in the content frame 504 to access the E-Review application. The user may view and/or submit 408 comments in the E-Review program without having to leave the Information Center framework. In one embodiment, E-Review may be displayed in a frame within the Information Center or within a separate window. In another embodiment, when a user is done viewing and/or submitting comments, the user may click 410 on a link in E-Review to return to viewing the document in the content frame 504. The method 400 ends.

FIG. 5 depicts an example embodiment of an apparatus for online documentation review. In one embodiment, the navigation frame 502 and the content frame 504 are positioned side-by-side. In certain embodiments, the documentation presentation module 210 visually displays a list of documents within the navigation frame 502. When a document 508 is selected, in another embodiment, the contents of the document 508 may be displayed in a content window 504. In one embodiment, a link 506 to the online review application may be displayed by the integration module 220, which, when clicked, may display the online review application presented by the documentation review module 215. The online review application may be displayed in a separate frame or may be displayed in a separate window. In yet a further embodiment, a search field 510 is provided by the search module 310, which allows a user to search the documentation package for specific content by keyword, date, author, and the like.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
providing an online documentation framework that visually presents a list of documents within a documentation package adjacent to content of at least one document selected from the list of documents by a user, the online documentation framework facilitating navigation of the list of documents of the documentation package, the online documentation framework generated using an integrated development environment;
providing a documentation review application that receives and stores comments associated with the selected at least one document in the documentation package, the documentation review application comprising a separate executable application from the online documentation framework, wherein the documentation review application is not natively included with the online documentation framework;
integrating the documentation review application into the online documentation framework such that comments associated with the selected at least one document of the documentation package may be one or more of submitted and viewed from within the online documentation framework, the comments being accessible using a link presented within the online documentation framework for the selected at least one document, the link directing a user to comments maintained for the selected at least one document by the documentation review application;

presenting one or more comments associated with the selected at least one document within the online documentation framework in response to verifying the user is separately logged into both the online documentation framework and the documentation review application, the presented one or more comments being updated in real-time in response to one or more users creating new comments for the selected at least one document using the documentation review application;

toggling presentation of the one or more comments in response to the user selecting the link such that the user can switch between displaying an unmarked-up version of the at least document and a marked-up version of the at least one document with comments presented interspersed throughout the document and searching for a document in the documentation package in response to user input, wherein the searching is synchronized with the visually presented list of documents adjacent to the content of the selected document such that documents in the visually presented list that match results of the search are visually highlighted in the list of documents.

2. The method of claim 1, wherein a scope of the search may be limited by user defined search parameters.

3. The method of claim 1, further comprising printing the contents of the documentation package, wherein the documentation package may be printed as one or more of the complete documentation package, sections of the documentation package, and individual documents within the documentation package.

4. The method of claim 1, wherein the documentation review application is displayed in one or more of a separate window and a frame within the online documentation framework in response to a user selecting the link.

5. The method of claim 1, wherein the online documentation framework is publicly accessible over a network such that users may collaborate and submit documentation feedback from remote locations.

6. The method of claim 5, wherein access to the online documentation framework is restricted to authorized users, and wherein authorization is verified via a security protocol, the security protocol using a username and password.

7. An apparatus comprising:

a documentation presentation module configured to visually present a list of documents within a documentation package adjacent to content of at least one document selected by a user from the list of documents in an online framework, the online framework facilitating navigation of the list of documents of the documentation package, the online documentation framework generated using an integrated development environment;

a documentation review module configured to receive and store comments associated with the selected at least one document in the documentation package, the documentation review application comprising a separate executable application from the online documentation framework, wherein the documentation review application is not natively included with the online documentation framework; and an integration module configured to:

integrate the documentation review module into the documentation presentation module such that comments associated with the selected at least one document of the documentation package may be one or more of submitted and viewed from within the online documentation framework, the comments being accessible using a link presented within the online documentation framework for the selected at least one document, the link directing a user to comments maintained for the selected at least one document by the documentation review application;

present one or more comments associated with the selected at least one document within the online documentation framework in response to verifying the user is separately logged into both the online documentation framework and the documentation review application, the presented one or more comments being updated in real-time in response to one or more users creating new comments for the selected at least one document using the documentation review application;

toggle presentation of the one or more comments in response to the user selecting the link such that the user can switch between displaying an unmarked-up version of the at least document and a marked-up version of the at least one document with comments presented interspersed throughout the document; and search for a document in the documentation package in response to user input, wherein the searching is synchronized with the visually presented list of documents adjacent to the content of the selected document such that documents in the visually presented list that match results of the search are visually highlighted in the list of documents, wherein at least a portion of the documentation presentation module, the documentation review module, and the integration module comprises one or more of hardware and code executable by a processor, the executable code stored on one or more non-transitory computer readable storage media.

8. The apparatus of claim 7, wherein a scope of the search may be limited by user defined search parameters.

9. The apparatus of claim 7, further comprising a print module configured to print the contents of the documentation package, wherein the documentation package may be printed as one or more of the complete documentation package, sections of the documentation package, and individual documents within the documentation package.

10. The apparatus of claim 7, wherein the online documentation framework is publicly accessible over a network such that users may collaborate and submit documentation feedback from remote locations.

11. The apparatus of claim 7, wherein the documentation review application is displayed in one or more of a separate window and a frame within the online documentation framework in response to a user selecting the link.

12. The apparatus of claim 7, wherein the integration module receives real-time information from the documentation review module and updates the comments related to a document in real-time.

13. A computer program product comprising a non-transitory computer readable storage medium storing machine readable code executed by a processor to perform the operations of:

provided an online documentation framework that visually presents a list of documents within a documentation package adjacent to content of at least one document selected from the list of documents by a user, the online documentation framework facilitating navigation of the list of documents of the documentation package, the online documentation framework generated using an integrated development environment;

providing a documentation review application that receives and stores comments associated with the selected at least one document in the documentation package, the documentation review application comprising a separate executable application from the online documentation framework, wherein the documentation review application is not natively included with the online documentation framework;

integrating the documentation review application into the online documentation framework such that comments associated with the selected at least one document of the documentation package may be one or more of submitted and viewed from within the online documentation framework, the comments being accessible using a link presented within the online documentation framework for the selected at least one document, the link directing a user to comments maintained for the selected at least one document by the documentation review application;

presenting one or more comments associated with the selected at least one document within the online documentation framework in response to verifying the user is separately logged into both the online documentation framework and the documentation review application, the presented one or more comments being updated in real-time in response to one or more users creating new comments for the selected at least one document using the documentation review application;

toggling presentation of the one or more comments in response to the user selecting the link such that the user can switch between displaying an unmarked-up version of the at least document and a marked-up version of the at least one document with comments presented interspersed throughout the document; and searching for a document in the documentation package in response to user input, wherein the searching is synchronized with the visually presented list of documents adjacent to the content of the selected document such that documents in the visually presented list that match results of the search are visually highlighted in the list of documents.

14. The computer program product of claim 13, wherein the scope of the search may be limited by user defined search parameters.

15. The computer program product of claim 13, further comprising printing the contents of the documentation package, wherein the documentation package may be printed as one or more of the complete documentation package, sections of the documentation package, and individual documents within the documentation package.

16. The computer program product of claim 13, wherein the online documentation framework is publicly accessible over a network such that users may collaborate and submit documentation feedback from remote locations.

17. The computer program product of claim 13, wherein the documentation review application is displayed in one or more of a separate window and a frame within the online documentation framework in response to a user selecting the link.

\* \* \* \* \*